United States Patent
Baur et al.

(10) Patent No.: US 8,346,447 B2
(45) Date of Patent: Jan. 1, 2013

(54) FEED-FORWARD CAMSHAFT PHASER CONTROL SYSTEMS AND METHODS

(75) Inventors: Andrew W. Baur, Flushing, MI (US); Michael J. Pitsch, Ann Arbor, MI (US); Christopher E. Whitney, Commerce, MI (US)

(73) Assignee: GM Global Technology Operations LLC

( * ) Notice: Subject to any disclaimer, the term of this patent is extended or adjusted under 35 U.S.C. 154(b) by 450 days.

(21) Appl. No.: 12/765,304

(22) Filed: Apr. 22, 2010

(65) Prior Publication Data

US 2011/0264342 A1 Oct. 27, 2011

(51) Int. Cl.
*G06F 7/00* (2006.01)

(52) U.S. Cl. .................................................. 701/54
(58) Field of Classification Search .................. None
See application file for complete search history.

*Primary Examiner* — Thomas Tarcza
*Assistant Examiner* — Adam Alharbi

(57) ABSTRACT

An engine control system includes an inertia phase detection module, a feed-forward (FF) engine speed module, a FF APC module, a FF phaser position module, and a phaser control module. The inertia phase detection module determines when an inertia phase of a gear shift is occurring within a transmission. The FF engine speed module predicts an engine speed for a future time when the inertia phase ends. The FF APC module predicts an air-per-cylinder (APC) for the future time based on the engine speed. The FF phaser position module determines a FF phaser position based on the engine speed and the APC. The phaser control module controls a camshaft phaser position based on the FF phaser position during the inertia phase of the gear shift.

20 Claims, 8 Drawing Sheets

FEED-FORWARD CAMSHAFT PHASER CONTROL SYSTEMS AND METHODS

FIELD

The present disclosure relates to internal combustion engines and more particularly valve phaser control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

An engine control system includes an inertia phase detection module, a feed-forward (FF) engine speed module, a FF APC module, a FF phaser postion module, and a phaser control module. The inertia phase detection module determines when an inertia phase of a gear shift is occurring within a transmission. The FF engine speed module predicts an engine speed for a future time when the inertia phase ends. The FF APC module predicts an air-per-cylinder (APC) for the future time based on the engine speed. The FF phaser position module determines a FF phaser position based on the engine speed and the APC. The phaser control module controls a camshaft phaser position based on the FF phaser position during the inertia phase of the gear shift.

An engine control method includes: determining when an inertia phase of a gear shift is occurring within a transmission; predicting an engine speed for a future time when the inertia phase ends; predicting an air-per-cylinder (APC) for the future time based on the engine speed; determining a feed-forward (FF) phaser position based on the engine speed and the APC; and controlling a camshaft phaser position based on the FF phaser position during the inertia phase of the gear shift.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
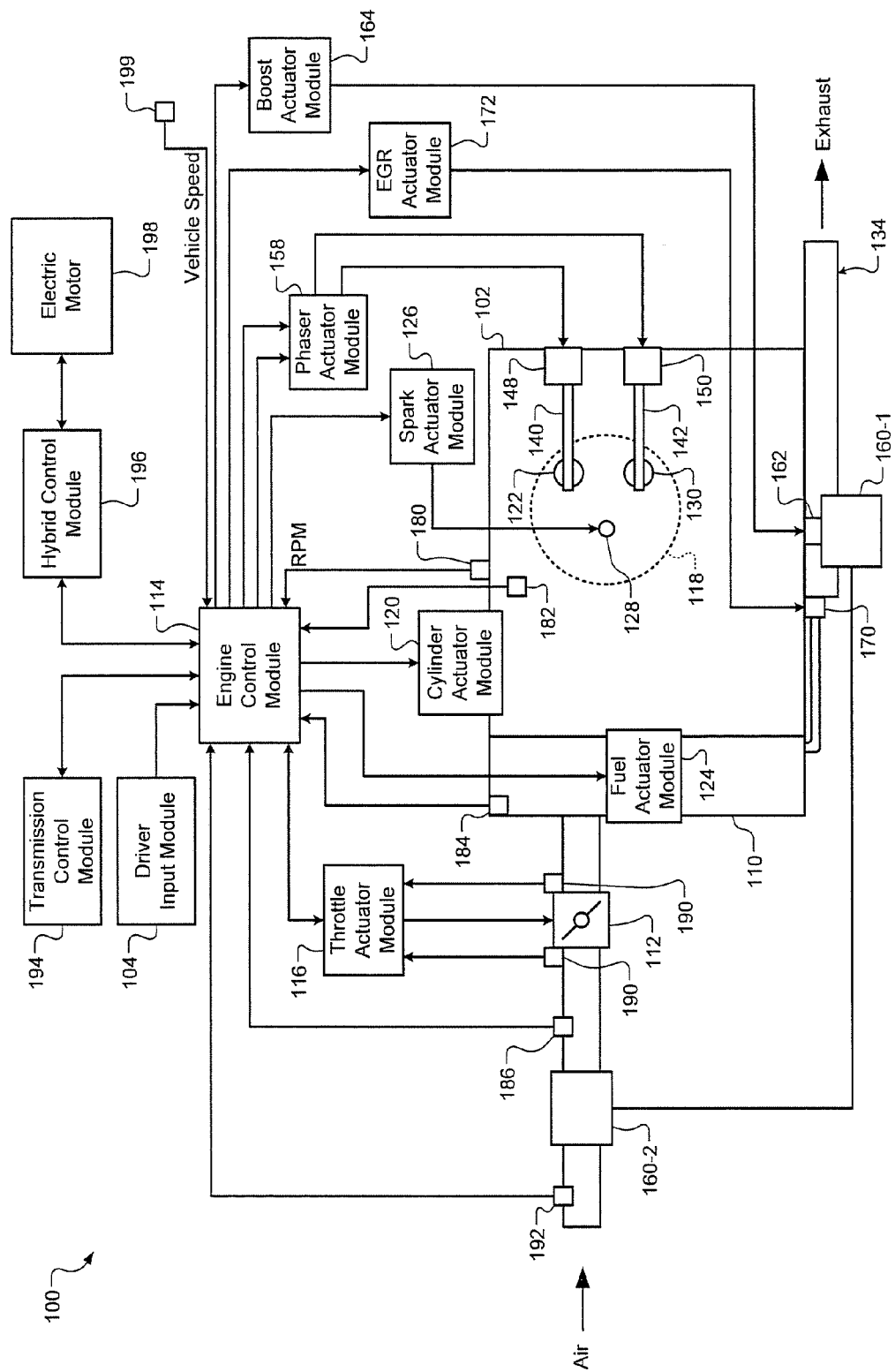
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Combustion of an air fuel mixture within an engine drives rotation of a crankshaft and produces torque. The engine transmits torque to a transmission, and the transmission transfers torque to wheels of the vehicle via a driveline. A gear (or gear ratio) selected within the transmission corresponds to a ratio of a transmission input shaft speed to a transmission output shaft speed. In this manner, the gear selected within the transmission controls how much torque output by the engine is transmitted to the wheels of the vehicle.

Figure 2:
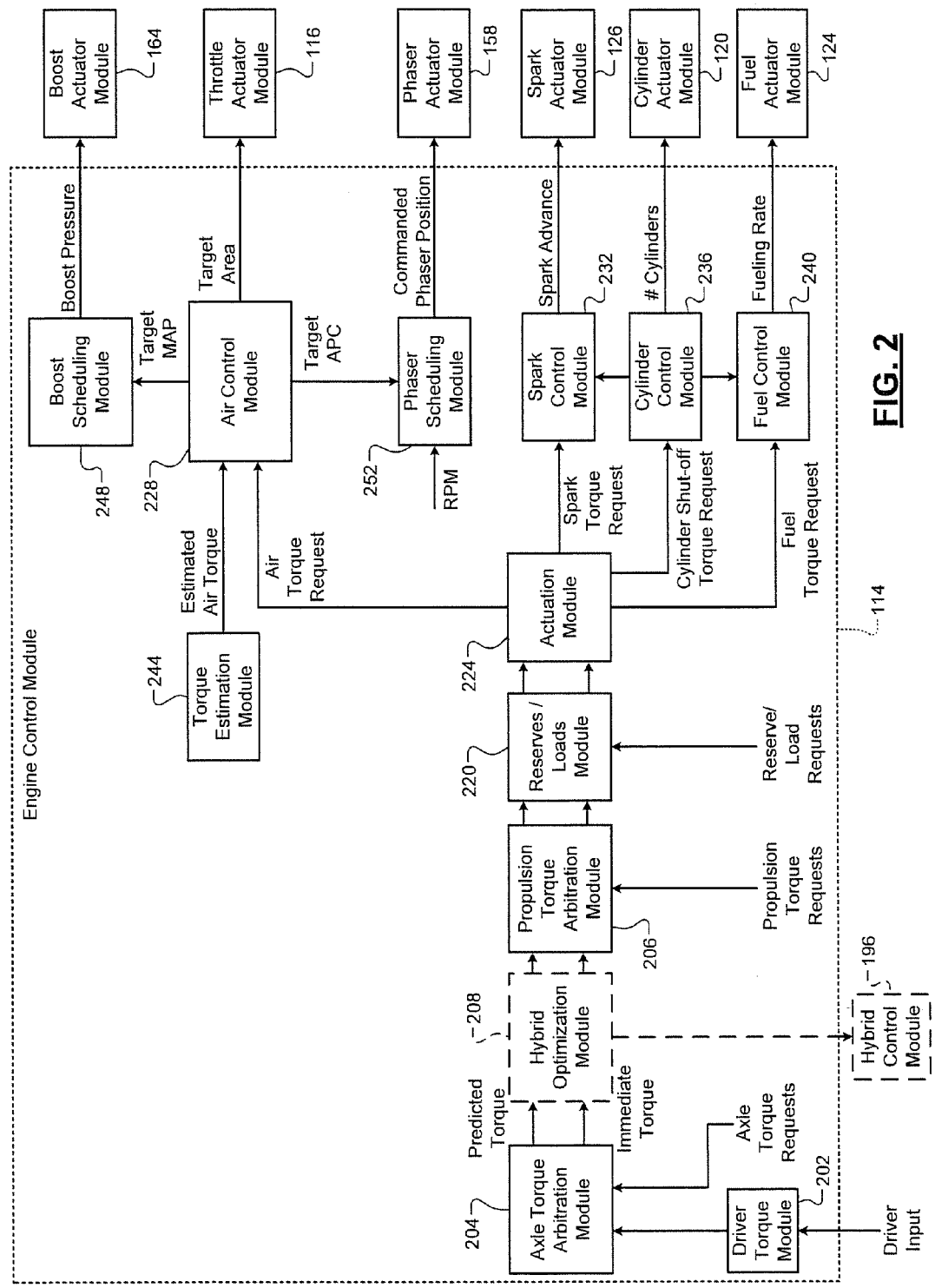
FIG. 2 is a functional block diagram of an exemplary engine control system according to the principles of the present disclosure.

FIG. 1 includes an exemplary engine system, and FIG. 2 includes an exemplary control module that controls the engine system. The control module generally controls an intake and/or an camshaft phaser position based on engine speed measured by an engine speed sensor and a target amount of air per cylinder (APC). More specifically, the control module determines a target phaser position based on the engine speed and the target APC and controls the intake and/or exhaust camshaft phaser position based on the target phaser position.

During a gear shift from a current gear (or gear ratio) to a next gear, inertia causes the engine speed to rapidly increase or decrease based on a gear ratio associated with the next gear. For example only, at a given vehicle speed, the engine speed decreases during an upshift (e.g., from a second gear to a third gear) and increases during a downshift.

For purposes of discussion only, a given gear shift may be said to consist of two sequential phases: a torque phase and an inertia phase. During the torque phase, the engine speed remains relatively the same while the transmission is prepared to shift to the next gear. During the inertia phase, the next gear is engaged, and the vehicle inertia increases or decreases the engine speed as the next gear is engaged.

Figure 5:
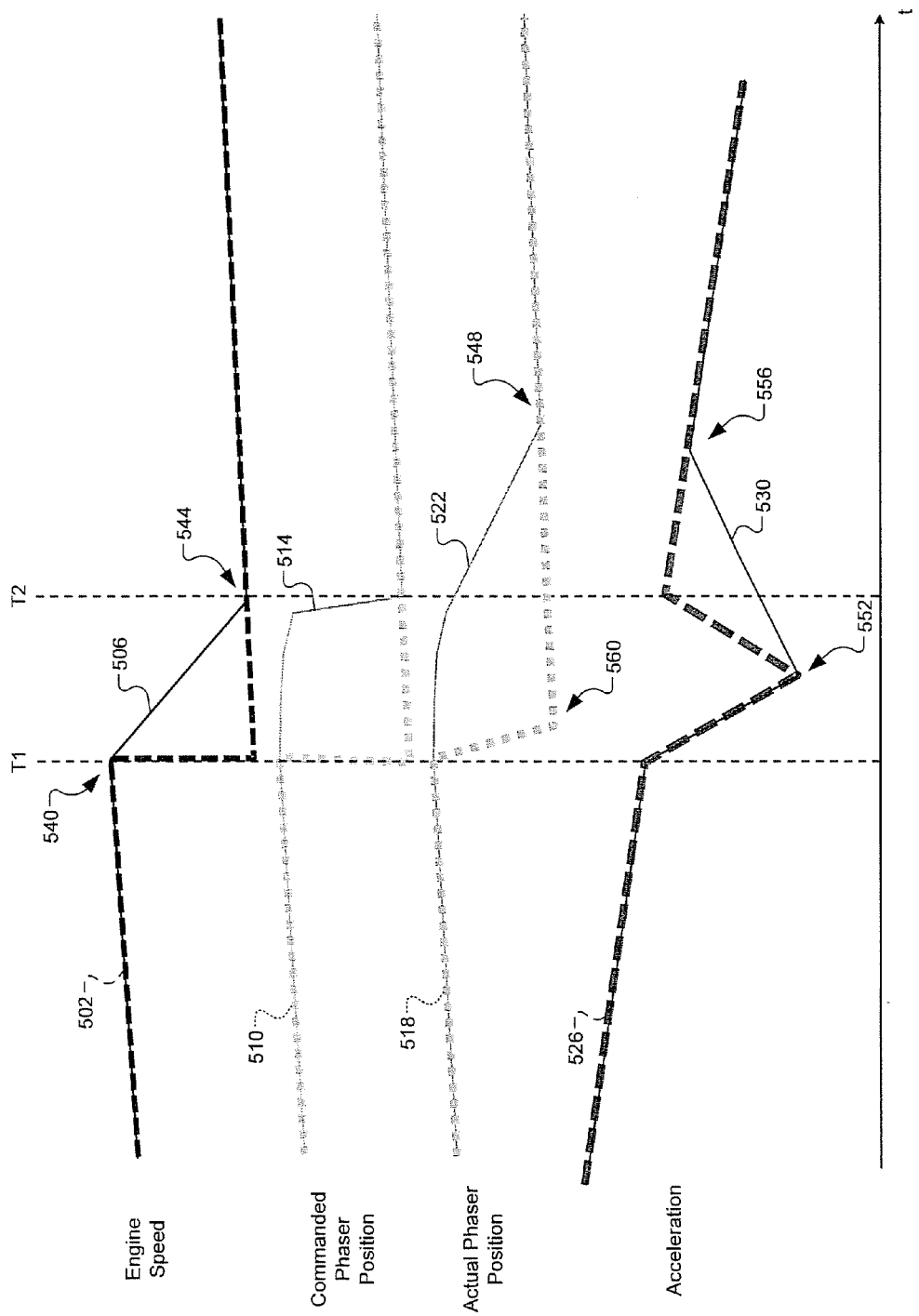
FIG. 5 is an exemplary graph of engine speed, commanded phaser position, actual phaser position, and acceleration as functions of time according to the principles of the present disclosure.
Figure 6:
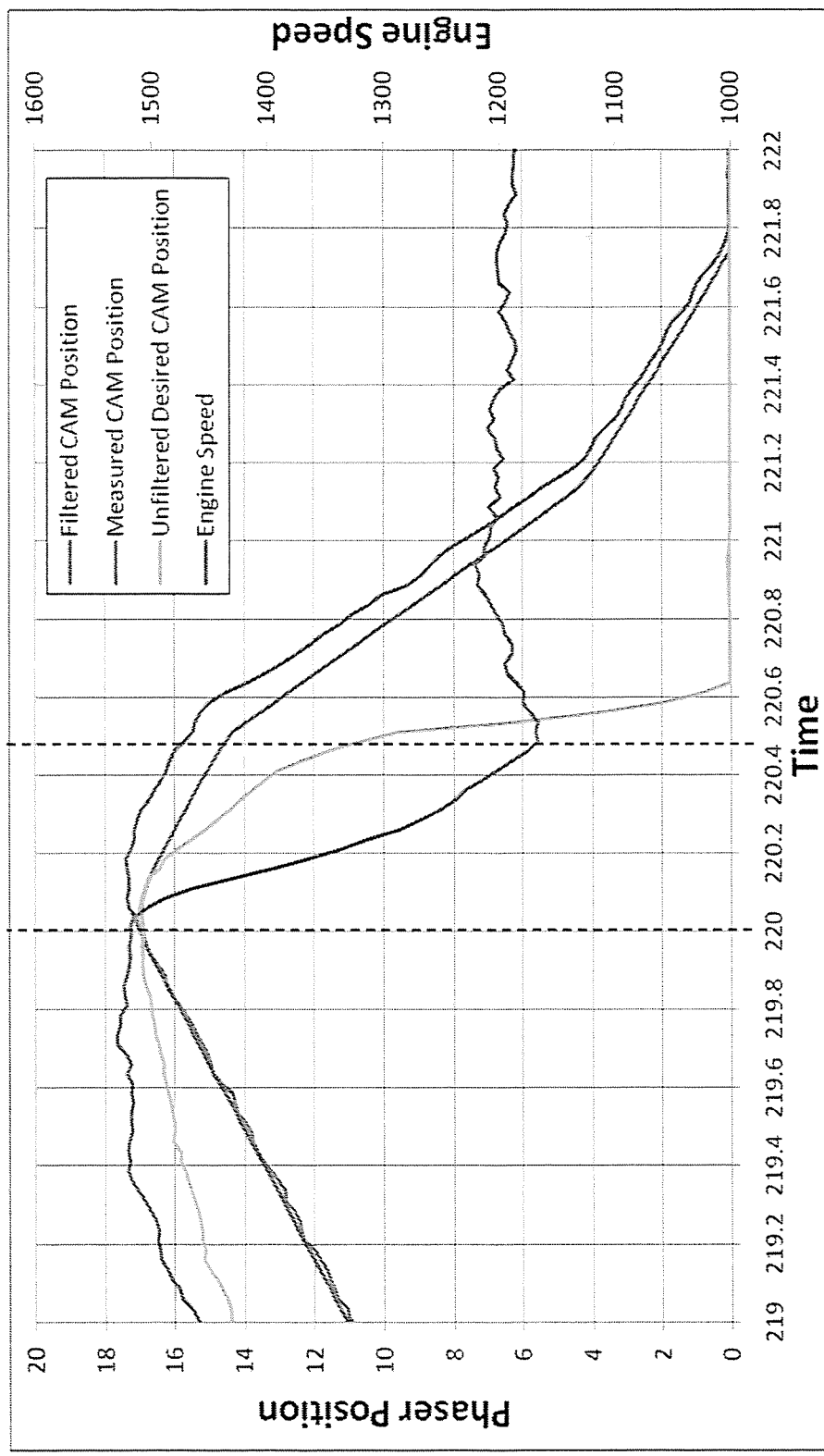
FIG. 6 is an exemplary graph of various phaser positions as a function of time without feed-forward (FF) phaser position control according to the principles of the present disclosure.

Controlling the intake and/or exhaust camshaft phaser position during the inertia phase of the gear shift based on the target phaser position, however, may limit vehicular acceleration when the inertia phase ends, when the next gear is engaged. More specifically, controlling the intake and/or exhaust camshaft phaser position based on the target phaser position during the inertia phase may result in the intake and/or exhaust camshaft phaser position reaching the target position after the inertia phase has ended. The intake and/or exhaust camshaft phaser position reaching the target phaser position after the inertia phase has ended may in turn prevent the actual APC from reaching the target APC. FIGS. 5 and 6 include exemplary illustrations of this phenomenon.

Figure 3:
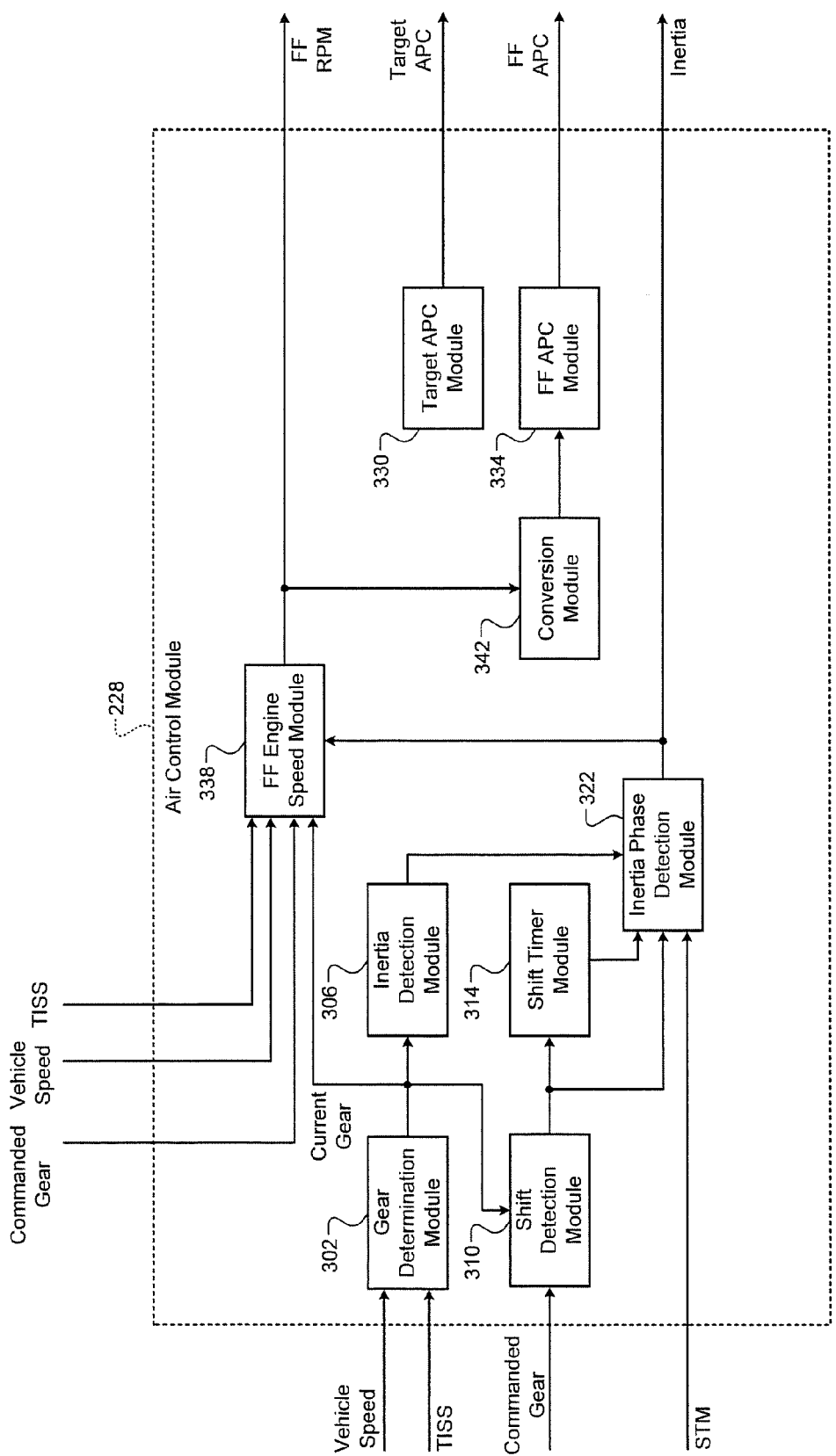
FIG. 3 is a functional block diagram of an exemplary air control module according to the principles of the present disclosure.

The control module of the present disclosure determines a feed-forward (FF) APC and a FF engine speed for when the inertia phase of the gear shift ends. The FF APC corresponds to a predicted value of the target APC when the inertia phase of the gear shift ends, and the FF engine speed corresponds to a predicted value of the engine speed when the inertia phase of the gear shift ends. FIG. 3 includes an exemplary module that determines the FF APC and the FF engine speed.

Figure 4:
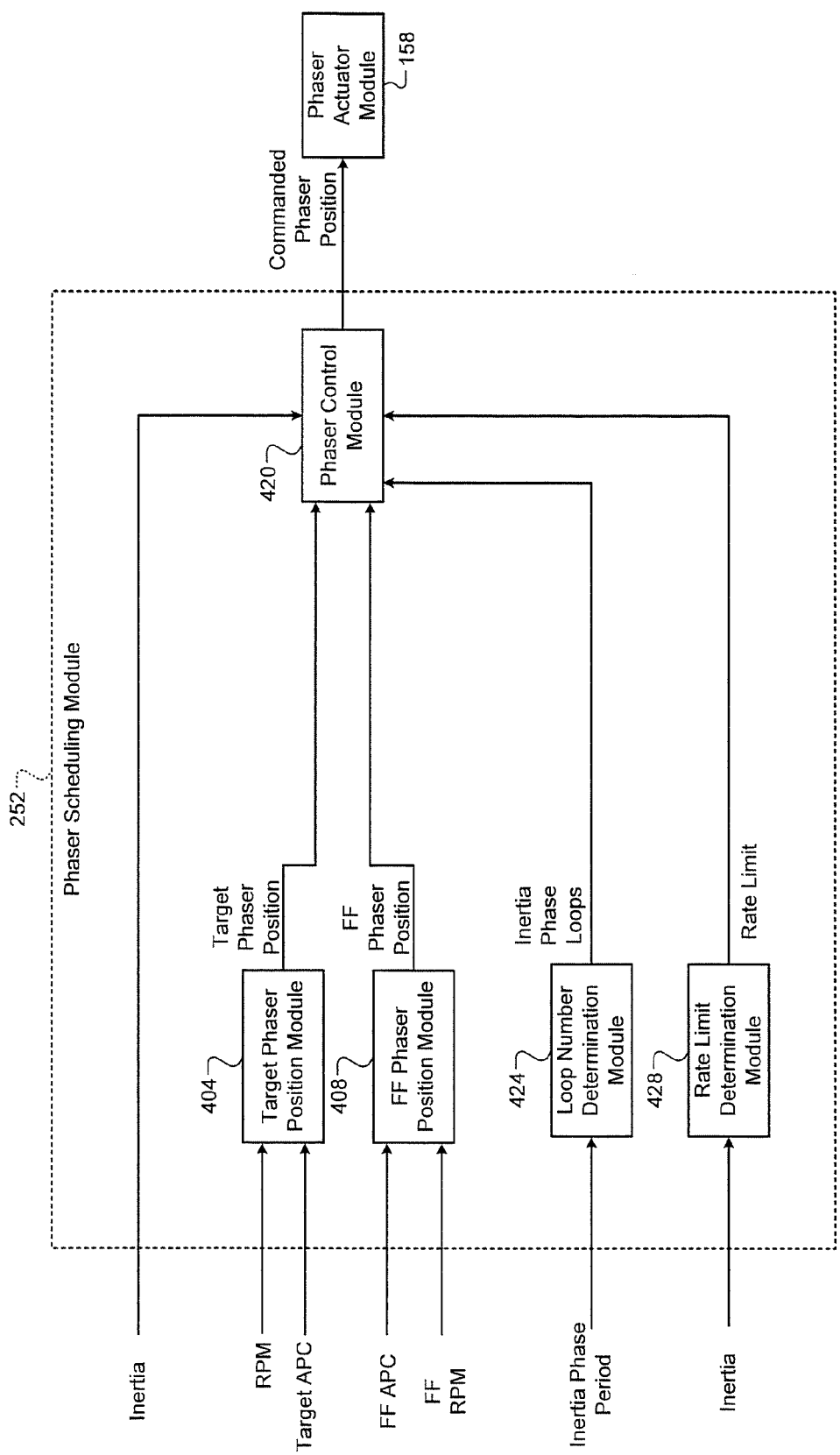
FIG. 4 is a functional block diagram of an exemplary phaser scheduling module according to the principles of the present disclosure.
Figure 7:
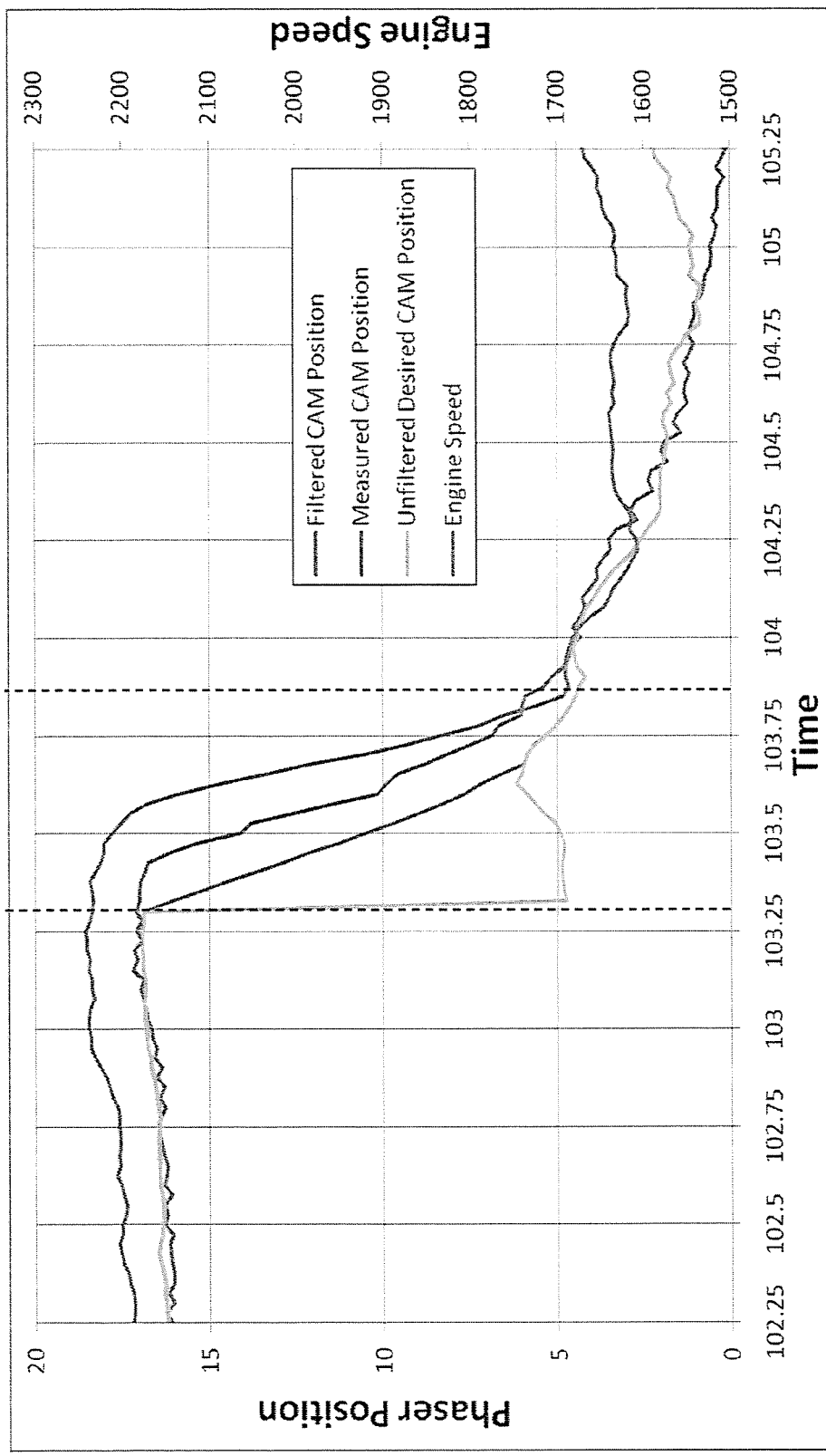
FIG. 7 is an exemplary graph of various phaser positions as a function of time with FF phaser position control according to the principles of the present disclosure.
Figure 8:
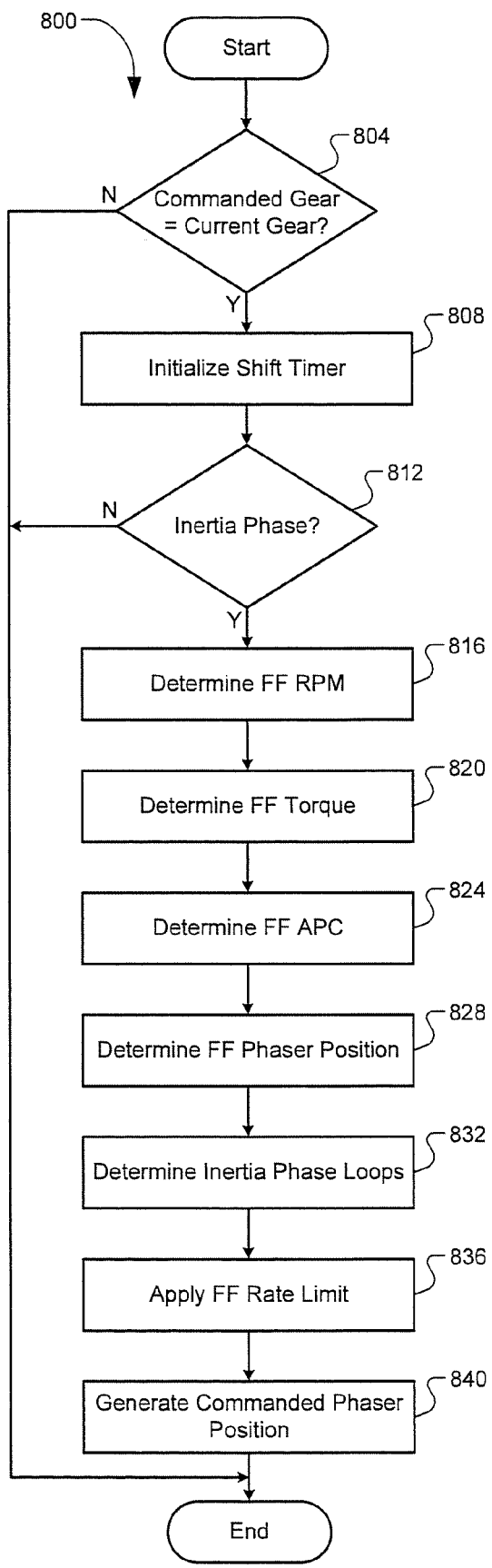
FIG. 8 is a flowchart depicting exemplary steps performed by a method according to the principles of the present disclosure.

The control module determines a FF phaser position based on the FF APC and the FF engine speed and controls the intake and/or exhaust camshaft phaser position based on the FF phaser position during the inertia phase of the gear shift. FIG. 4 includes an exemplary module that determines the FF phaser position based on the FF APC and the FF engine speed. FIGS. 5 and 7 include exemplary illustrations of controlling of the intake and/or exhaust camshaft camshaft phaser position based on the FF phaser position during the inertia phase of the gear shift. FIG. 8 includes an exemplary method of controlling the intake and/or exhaust camshaft phaser position based on the FF phaser position during the inertia phase of the gear shift.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various implementations, one camshaft may control the intake valve 122 and the exhaust valve 130.

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on a commanded phaser position from the ECM 114. When the intake and exhaust cam phasers 148 and 150 are independently controllable, the ECM 114 may provide the phaser actuator module 158 with more than one commanded phaser position. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The rotational speed of the crankshaft (in RPM) may be referred to as the engine speed. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. A gear shift may refer to the process of changing of the gear (or gear ratio) selected within the transmission. The gear ratio may correspond to a ratio of a transmission input shaft speed to a transmission output shaft speed. As a ratio of a driveline (not shown) through which the transmission transmits torque to wheels of the vehicle includes a fixed gear ratio, the gear ratio may also be determined or represented by a ratio of the transmission input shaft speed to vehicle speed or another suitable speed ratios. The vehicle speed may be measured using a vehicle speed sensor 199 or may be determined based on one or more other speeds, such as one or more wheel speeds.

The ECM 114 may also communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the TCM 194, and the hybrid control module 196 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, cam phaser positions, boost pressure, and EGR valve opening area, respectively. The ECM 114 may control actuator values in order to cause the engine 102 to achieve a target engine output torque.

Referring now to FIG. 2, a functional block diagram of an exemplary engine control system is presented. An exemplary implementation of the ECM 114 includes a driver torque module 202. The driver torque module 202 may determine a driver torque request based on one or more driver inputs from the driver input module 104. The driver input may be based on a position of an accelerator pedal and/or a position of a brake pedal. The driver input may also be based on cruise control, which may be an adaptive cruise control system that varies the vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including the engine 102 and/or the electric motor 198. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine system 100.

In general terms, the immediate torque request is the amount of currently desired axle torque, while the predicted torque request is the amount of axle torque that may be needed on short notice. The ECM 114 therefore controls the engine system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine system 100 to the immediate torque request. However, the ECM 114 controls the engine system 100 so that the engine system 100 can quickly resume producing the predicted torque request once the wheel slip stops.

In general terms, the difference between the immediate torque request and the higher predicted torque request can be referred to as a torque reserve. The torque reserve may represent the amount of additional torque that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request if the fast actuators were set to appropriate values. Meanwhile, the ECM 114 may set actuator values for fast actuators to values that, given the slow actuator values, cause the engine system 100 to produce the immediate torque request instead of the predicted torque request.

The fast actuator values therefore cause the engine system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the engine system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another exemplary use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 and the boost actuator module 164 may be emissions actuators. In this manner, the fuel mass may be set based on the immediate torque request, and the throttle opening area and boost may be set based on the predicted torque request. The throttle opening area may generate more air flow than necessary to satisfy the predicted torque request. In turn, the air flow generated may be more than required for complete combustion of the injected fuel such that the air/fuel ratio is usually lean and changes in air flow do not affect the engine torque output. The engine output torque will therefore be equal to the immediate torque request and may be increased or decreased by adjusting the fuel flow.

The throttle actuator module 116, the boost actuator module 164, and the EGR valve 170 may be controlled based on the predicted torque request to control emissions and to minimize turbo lag. The throttle actuator module 116 may create a vacuum to draw exhaust gases through the EGR valve 170 and into the intake manifold 110.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine target actuator values for actuators that control engine airflow parameters based on the air torque request. For example, the air control module 228 may determine a target manifold absolute pressure (MAP), a target throttle opening area, and a target air per cylinder (APC). The target MAP may be used to determine a target boost, and the target APC may be used to determine the commanded cam phaser position. In various implementations, the air control module 228 may also determine an amount of opening of the EGR valve 170.

The actuation module 224 may also generate a spark torque request, a cylinder shut-off torque request, and a fuel torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request from the actuation module 224. During normal operation of a spark-ignition engine, the fuel control module 240 may operate in an air lead mode in which the fuel control module 240 attempts to maintain a stoichiometric air/fuel ratio by controlling fuel flow based on air flow. The fuel control module 240 may determine a fuel mass that will yield stoichiometric combustion when combined with the current APC. The fuel control module 240 may instruct the fuel actuator module 124 via the fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

A torque estimation module 244 may estimate torque output of the engine 102. This estimated torque may be used by the air control module 228 to perform closed-loop control of engine air flow parameters (via the target actuator values), such as the throttle area, the MAP, and the APC. For example, a torque relationship such as $$T = f(APC, S, I, E, AF, OT, \#) \qquad (1)$$

may be defined, where torque (T) is a function of the current APC, spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. This relationship may be modeled by an equation and/or may be stored as a lookup table. The torque estimation module 244 may estimate the current APC based on measured MAF and current RPM. The intake and exhaust cam phaser positions used may be based on actual positions, as the phasers may be traveling toward commanded positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow conditions if spark retard was removed (i.e., spark timing was set to the calibrated spark advance value) and all cylinders were fueled.

Calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#) \qquad (2).$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

The air control module 228 may output the target area signal to the throttle actuator module 116. The throttle actuator module 116 then regulates the throttle valve 112 to achieve the target throttle area. The air control module 228 may generate the target area signal based on an inverse torque model and the air torque request. The air control module 228 may use the estimated air torque and/or the MAF signal in order to perform closed loop control of the engine air flow. For example, the target area signal may be controlled to minimize a difference between the estimated air torque and the air torque request.

The air control module 228 may output the target MAP to a boost scheduling module 248. The boost scheduling module 248 may use the target MAP to control the boost actuator module 164. The boost actuator module 164 may then control one or more turbochargers (e.g., the turbocharger including the turbine 160-1 and the compressor 160-2) and/or superchargers based on the target MAP. The air control module 228 may generate the target map based on an inverse torque model and the air torque request.

The air control module 228 may output the target APC to a phaser scheduling module 252. The phaser scheduling module 252 controls the cam phaser positions based on the RPM and the target APC during normal operation. During a gear shift, however, the phaser scheduling module 252 selectively controls the cam phaser positions based on feed-forward parameters.

For ease of discussion, the gear shift may be said to consist of two sequential phases: a torque phase and an inertia phase. During the torque phase of the gear shift, the TCM 194 may prepare the transmission for the shift from the current gear to a next gear while maintaining the RPM. One or more clutches may be filled, released, applied, or otherwise prepared during the torque phase of the given gear shift. For example only, while not shown, a disengaging clutch (associated with the current gear) and an engaging clutch (associated with the next gear) may be actuated to hold torque during the torque phase.

During the inertia phase of the gear shift, the amount of torque held by the engaging clutch is increased, the disengaging clutch is released, and the current gear is transitioned to the next gear. When the gear shift is an upshift (e.g., second gear to third gear), the inertia of the vehicle may decrease the RPM during the inertia phase of the gear shift. This decrease allows the engine 102 to operate at lower RPM at a given vehicle speed when the next gear (of a lower gear ratio) engaged within the transmission. When the gear shift is a downshift (e.g., third gear to second gear), the inertia of the vehicle may increase the RPM during the inertia phase of the gear shift.

The air control module 228 may determine the feed-forward (FF) parameters that the phaser scheduling module 252 selectively uses in controlling the intake and/or exhaust camshaft phaser position during the gear shift. More specifically, the phaser scheduling module 252 generates the commanded phaser position(s) based on the FF parameters during the inertia phase of the gear shift. The phaser actuator module 158 controls the intake and exhaust cam phaser positions based on the commanded phaser position(s).

The FF parameters may correspond to predicted values of respective parameters when the inertia phase of the gear shift ends and the next gear is engaged. For example only, the FF parameters may include a feed-forward (FF) APC and a feed-forward (FF) RPM. The FF APC may correspond to a predicted value of the target APC when the inertia phase ends and the next gear is engaged, and the FF RPM may correspond to a predicted value of the RPM when the inertia phase ends and the next gear is engaged. The air control module 228 provides the FF APC and the FF RPM to the phaser scheduling module 252 for the inertia phase of the gear shift.

In this manner, the phaser scheduling module 252 controls the intake and/or exhaust camshaft phaser position during the inertia phase of the gear shift in a feed-forward configuration based on the predicted values of the target APC and the RPM when the inertia phase ends. Feed-forward control of the intake and/or exhaust camshaft phaser position allows the engine system 100 to achieve a predetermined acceleration when the inertia phase ends and the next gear is engaged. Feed-forward control of the intake and/or exhaust camshaft phaser position may also provide greater fuel economy and/or a better feel within the passenger cabin.

Referring now to FIG. 3, a functional block diagram of an exemplary implementation of the air control module 228 is presented. The air control module 228 may include a gear determination module 302, an inertia detection module 306, a shift detection module 310, a shift timer module 314, and an inertia phase detection module 322. The air control module 228 may also include a target APC module 330, a feed-forward (FF) APC module 334, a feed-forward (FF) engine speed module 338, and a conversion module 342.

The gear determination module 302 determines which gear (or gear ratio) is engaged within the transmission. In other words, the gear determination module 302 determines a current gear. The gear determination module 302 may determine the current gear based on a ratio of the transmission input shaft speed to the vehicle speed. In various implementations, the gear determination module 302 may determine the current gear based on other speeds or speed ratios. For example only, the gear determination module 302 may use a transmission output shaft speed, a wheel speed, or another suitable speed in place of the vehicle speed, and/or may use a torque converter (e.g., turbine) output speed or another suitable speed in place of the transmission input shaft speed.

The inertia detection module 306 receives the current gear from the gear determination module 302. The inertia detection module 306 compares the current gear with a last current gear. The last current gear may be the current gear determined by the inertia detection module 306 and provided to the inertia detection module 306 during a last control loop.

The inertia detection module 306 generates a first inertia phase signal based on a comparison of the current gear and the last current gear. For example only, the inertia detection module 306 may set the first inertia phase signal to an active state (e.g., 5 V) when the current gear and the last current gear are unequal. The inertia detection module 306 may also set the first inertia phase signal to an inactive state (e.g., 0 V) when the current and last current gears are equal. As the current gear remains the same during the torque phase of the gear shift, a change in the current gear (i.e., a difference between the last current gear and the current gear) indicates that the inertia phase of the gear shift is occurring. The inertia detection module 306 provides the first inertia phase signal to the inertia phase detection module 322.

The shift detection module 310 compares the current gear with a commanded gear. The ECM 114 may receive the commanded gear from the TCM 114. The shift detection module 310 generates a gear shift signal based on the comparison of the current gear and the commanded gear. For example only, the shift detection module 310 may set the gear shift signal to an active state (e.g., 5 V) when the current gear and the commanded gear are unequal. The shift detection module 310 may also set the gear shift signal to an inactive state (e.g., 0 V) when the current and commanded gears are equal. In this manner, the setting of the gear shift signal to the active state indicates that the TCM 194 has initiated the torque phase of a gear shift. The shift detection module 310 provides the gear shift signal to the inertia phase detection module 322.

The shift timer module 314 also receives the gear shift signal, and initializes a shift timer when the gear shift signal transitions from the inactive state to the active state. In other words, the shift timer module 314 initializes the shift timer when the TCM 194 initiates the torque phase of the gear shift. For example only, the shift timer module 314 may initialize the shift timer by setting the shift timer to a predetermined reset value (e.g., zero) and starting the shift timer counting. The shift timer therefore tracks the period of time that has passed since the torque phase of the gear shift began.

The shift timer module 314 generates a second inertia phase signal based on the shift timer. For example only, the shift timer module 314 may set the second inertia phase signal to an active state (e.g., 5 V) when the shift timer is greater than a predetermined period. The shift timer module 314 may also set the second inertia phase signal to an inactive state (e.g., 0 V) when the shift timer is less than the predetermined period.

The predetermined period may correspond to an expected length (period) of the torque phase of the gear shift. The predetermined period may be variable based on the gear shift. For example only, the predetermined period for gear shifts between higher gears (e.g., fifth to sixth, fourth to fifth, or vice versa) may be shorter than gear shifts between lower gears (e.g., first to second, second to third, or vice versa). For example only, the predetermined period for a gear shift having a shortest torque phase may be approximately 100 ms. The shift timer module 314 provides the second inertia phase signal to the inertia phase detection module 322.

The inertia phase detection module 322 generates an inertia signal based on the first inertia phase signal, the second inertia phase signal, and the gear shift signal. For example only, the inertia phase detection module 322 may set the inertia signal to a first state (e.g., 5 V) when the first and second inertia phase signals are in the active state, and the gear shift signal is in the active state. The inertia phase detection module 322 may set the inertia signal to a second state (e.g., 0 V) when one or more of the gear shift signal and the first and second inertia phase signals are in the inactive state. In this manner, the inertia phase detection module 322 transitions the inertia signal to the first state when the inertia phase of the gear shift begins and maintains the inertia signal in the first state until the inertia phase of the gear shift ends and the gear shift is complete.

The inertia phase detection module 322 may generate the inertia signal further based on a shift (or spark) torque management (STM) signal provided by the TCM 194. The TCM 194 may request the actuation module 224 to generate the spark torque request such that the spark control module 232 retards the spark timing during the gear shift. The TCM 194 may set the STM signal to an active state (e.g., 5 V) when the TCM 194 is requesting retardation of the spark timing for the gear shift. For example only, the inertia phase detection module 322 may require that the STM signal be in the active state before setting the inertia signal to the first state.

The inertia phase detection module 322 provides the inertia signal to the phaser scheduling module 252. The phaser scheduling module 252 selects one of the target APC and the FF APC based on the state of the inertia signal. More specifically, the phaser scheduling module 252 selects the FF APC module when the inertia signal is in the first state. The phaser scheduling module 252 controls the phaser positions based on the selected one of the target and FF APCs, as discussed below in conjunction with the exemplary embodiment of FIG. 4. In this manner, the phaser scheduling module 252 controls the phaser positions based on the FF APC during the inertia phase of the gear shift.

The target APC module 330 determines the target APC for normal operation. In the context of the present disclosure, normal operation may refer to times outside of the inertia phase of a gear shift. The target APC module 330 may determine the target APC based on one or more suitable parameters, such as the air torque request. The target APC module 330 provides the target APC to the phaser scheduling module 252 for use in controlling the phaser positions during normal operation.

The FF APC module 334 determines the FF APC for the phaser scheduling module 252 to use in controlling the phaser positions during inertia phase of the gear shift. The FF APC module 334 determines the FF APC based on the FF RPM. The FF engine speed module 338 determines the FF RPM.

The FF engine speed module 338 may determine the FF RPM based on the vehicle speed, the commanded gear, the current gear before the torque phase of the gear shift began, and the current gear. For example only, the FF engine speed module 338 may determine the FF RPM using the equation:

$$FF\ RPM = \frac{TISS}{VS} * \frac{GCommanded}{GBeforeShift} * VS + \text{Slip},\qquad(3)$$

where TISS is the transmission input shaft speed, VS is the vehicle speed, GCommanded is the commanded gear, GBeforeShift is the current gear when the torque phase of the gear shift began, and Slip is a torque converter slip. The torque converter slip may refer to a difference between the RPM (or torque converter impeller speed) and the transmission input shaft speed (or turbine speed). The FF RPM corresponds to a predicted value of the RPM when the inertia phase of the gear shift ends and the commanded gear is engaged within the transmission. The quotient of the TISS over VS may be held constant until the gear shift is completed.

The FF engine speed module 338 provides the FF RPM to the phaser scheduling module 252 for use in controlling the phaser positions during the inertia phase of the gear shift, as discussed below in conjunction with the exemplary embodiment of FIG. 4. The FF engine speed module 338 also provides the FF RPM to the conversion module 342.

The conversion module 342 may convert the FF RPM into the torque domain based on the driver torque request. In other words, the conversion module 342 determines a feed-forward (FF) torque based on the FF RPM and the driver torque request. The FF torque may correspond to the engine torque output necessary to achieve the FF RPM and the driver torque request when the inertia phase of the gear shift ends.

The FF APC module 334 may determine the FF APC based on the FF torque. For example only, a torque relationship may be inverted to solve for the FF APC. For example only, for a given FF torque ($T_{FF}$), the FF APC may be determined based on the relationship:

$$FFAPC = T^-(T_{FF}, S, I, E, AF, OT, \#).\qquad(4)$$

This relationship may be embodied as an equation and/or as a lookup table.

Referring now to FIG. 4, a functional block diagram of an exemplary embodiment of the phaser scheduling module 252 is presented. The phaser scheduling module 252 may include a target phaser position module 404, a feed-forward (FF) phaser position module 408, and a phaser control module 420. The phaser scheduling module 252 may also include a loop number determination module 424 and a rate limit determination module 428.

The target phaser position module 404 determines a target phaser position for controlling the intake and/or exhaust camshaft phaser position during normal operation. The target phaser position module 404 may determine the target phaser position based on, for example, the target APC and the RPM. The target phaser position module 404 provides the target phaser position to the phaser control module 420.

The FF phaser position module 408 determines a feed-forward (FF) phaser position for controlling the intake and/or exhaust camshaft phaser position during the inertia phase of the gear shift. The FF phaser position module 408 provides the FF phaser position to the phaser control module 420.

The phaser control module 420 controls the intake and/or exhaust camshaft phaser position via the phaser actuator module 158. More specifically, the phaser control module 420 provides the commanded phaser position to the phaser actuator module 158. The phaser actuator module 158 controls the intake and exhaust cam phasers 148 and 150 based on the commanded phaser position. In this manner, the phaser control module 420 controls the intake and/or exhaust camshaft phaser position based on the FF phaser position.

The phaser control module 420 generates the commanded phaser position based on the target phaser position when the inertia signal is in the second state (i.e., during normal operation). When the inertia signal is in the first state (i.e., during the inertia phase of the gear shift), the phaser control module 420 generates the commanded phaser position based on the FF phaser position. In engine systems where the intake and exhaust camshaft phaser positions are controlled independently, the phaser control module 420 may generate one commanded phaser position for each of the intake and exhaust camshaft phaser positions.

When the inertia signal transitions from the second state to the first state, the phaser control module 420 determines a ramp rate for transitioning the commanded phaser position from the target phaser position to the FF phaser position. For example only, the phaser control module 420 may determine a difference between the FF phaser position and the target phaser position when the inertia signal transitions from the second state to the first state and determine the ramp rate based on a quotient of the difference over an inertia phase period. The inertia phase period corresponds to a predetermined period within which the inertia phase of the gear shift will be accomplished.

In various implementations, the phaser control module 420 may ramp the commanded phaser position from the target phaser position to the FF phaser position in a number of steps of a magnitude during the inertia phase of the gear shift. The number of steps may correspond to a quotient of the inertia phase period over a loop rate of the phaser scheduling module 252. For example only, the loop rate of the phaser scheduling module 252 may be approximately 25 ms.

The loop number determination module 424 may determine the number of steps (i.e., the number of control loops in the inertia phase of the gear shift) as the quotient of the inertia phase period over the loop rate of the phaser scheduling module 252, rounding down to a nearest integer. The phaser control module 420 may determine the magnitude for each of the steps based on a quotient of a difference between the target and FF phaser positions over the number of steps. The phaser control module 420 may adjusts the commanded phaser position toward the FF phaser position by one step during each control loop. In this manner, the commanded phaser position reaches the FF phaser position before, but as close as possible, to when the inertia phase of the gear shift ends.

The phaser control module 420 rate limits changes in the commanded phaser position. The rate limit may be variable. The rate limit determination module 428 determines the rate limit and provides the rate limit to the phaser control module 420. The phaser control module 420 may rate limit changes in the commanded phaser position based on the rate limit provided by the rate limit determination module 428.

The rate limit determination module 428 may set the rate limit equal to a first rate limit when the inertia signal is in the second state. For example only, the first rate limit may be approximately 0.3° cam angle degrees per control loop. In terms of crankshaft angle degrees (CAD), the first rate limit may be approximately 0.6 CAD per control loop.

When the inertia signal is in the first state (i.e., during the inertia phase of the gear shift), the rate limit determination module 428 may set the rate limit equal to a second rate limit. Relative to the first rate limit, the second rate limit allows for greater changes in the commanded phaser position for a control loop. For example only, the second rate limit may be approximately 1.2° cam angle degrees per control loop or approximately 2.4 CAD per control loop. The second rate limit may be set to or based on the magnitude of the steps of a gear shift having a shortest inertia phase period (relative to the other gear shifts) and therefore the largest step magnitude. In this manner, the phaser control module 420 allows for larger changes in the commanded phaser position during the inertia phase of the gear shift.

Referring now to FIG. 5, a graph of engine speed (in RPM), commanded phaser position, actual phaser position, and acceleration as a function of time is presented. The inertia phase of the gear shift begins at approximately time T1 and ends at time approximately T2 in the exemplary embodiment of FIG. 5. In the exemplary embodiment of FIG. 5, the gear shift is an upshift, such as a shift from a second gear to a third gear, the third gear to a fourth gear, or another suitable upshift. While the gear shift is shown and will be discussed as an upshift, the present disclosure is also applicable to downshifts, such a shift from the fourth gear to the third gear, from the third gear to the second gear, or another suitable downshift.

Dashed trace 502 tracks the FF RPM, and trace 506 tracks the RPM measured by the RPM sensor 180. Dashed trace 510 tracks the commanded phaser position when commanded phaser position is generated based on the FF phaser position during the inertia phase of the gear shift. Trace 514 tracks the commanded phaser position when commanded phaser position is generated based on the target phaser position during the inertia phase of the gear shift.

Dashed trace 518 tracks the actual phaser position when the commanded phaser position is generated based on the FF phaser position during the inertia phase of a gear shift, and trace 522 tracks the actual phaser position the commanded phaser position is generated based on the target phaser position during the inertia phase of the gear shift. Dashed trace 526 tracks the acceleration when the phaser actuator module 158 is controlled based on the FF phaser positions during the inertia phase of the gear shift, and trace 530 tracks the acceleration when the phaser actuator module 158 is controlled based on the target phaser position during the inertia phase of the gear shift.

As illustrated by the RPM 506, the RPM 506 decreases from a first RPM level 540 when the current gear is engaged to a second RPM level 544 when the next gear is engaged. The inertia of the vehicle draws the RPM 506 down to the second RPM level 544 during the inertia phase of the upshift as illustrated by the negative slope of the RPM 506 between times T1 and T2. When the inertia phase of the gear shift begins, at approximately time T1, the FF RPM 502 decreases to the predicted value of the RPM 506 when the next gear is engaged and the inertia phase of the upshift ends. In other words, the FF RPM 502 decreases to approximately the second RPM level 544 at approximately time T1.

The target phaser position 514 is substantially maintained during the inertia phase of the upshift and decreases near time T2 as the end of the inertia phase nears. The phaser control module 420 applies the first predetermined rate limit in adjusting the actual phaser position 522 toward the target phaser position 514 in response to the decrease in the target phaser position 514 near time T2. Accordingly, the actual phaser position 522 eventually reaches the target phaser position 514 some time after the inertia phase has ended, as illustrated by 548.

This delay in the actual phaser position 522 reaching the target phaser position 514 may impose a limit on the acceleration 530 and cause the acceleration 530 to be less than the predetermined acceleration. This limit acceleration is illustrated by the slope of acceleration 530 between 552 and 556. Another exemplary illustration of controlling the cam phaser positions based on the target phaser position during the inertia phase of an upshift is also shown in the exemplary embodiment of FIG. 6.

In contrast with the target phaser position 514, the FF phaser position 510 decreases rapidly at approximately time T1 at approximately the beginning of the inertia phase of the upshift. The FF phaser position 510 decreases to approximately the commanded phaser position after the inertia phase has ended and the upshift has completed.

The phaser control module 420 applies the second predetermined rate limit in adjusting the actual phaser position 518 toward the FF phaser position 510 in response to the decrease in the FF phaser position 510 near time T1. Accordingly, the actual phaser position 518 reaches the FF phaser position 510 before the inertia phase ends, as illustrated by 560.

While the actual phaser position 518 is shown as reaching the FF phaser position 510 shortly after time T1, the second predetermined rate limit may be set such that the actual phaser position 518 reaches the FF phaser position 510 at or near (but before) time T2 when the inertia phase ends. Adjusting the actual phaser position 518 to the FF phaser position 510 at or before the end of the inertia phase allows the acceleration 526 to be greater than the acceleration 530 when the inertia phase ends. This greater acceleration is illustrated by the slope of the acceleration 526 being greater than the slope of the acceleration 530. An exemplary illustration of controlling the cam phaser positions based on the FF phaser position during the inertia phase of an upshift is also shown in the exemplary embodiment of FIG. 7.

Referring now to FIG. 8, a flowchart depicting exemplary steps performed by a method 800 are presented. Control may begin with 804 where control may determine whether the commanded gear is equal to the current gear. If true, control may continue with 808; if false, control may end. In this manner, control determines whether the TCM 194 has initiated the gear shift.

Control initializes the shift timer at 808. For example only, control may reset the shift timer to the predetermined reset value and begin the shift timer counting at 808. In this manner, the shift timer tracks the period of time passed since the TCM 194 initiated the gear shift. Control determines whether the inertia phase of the gear shift has begun at 812. If true, control may continue with 816; if false, control may end. For example only, control may determine that the inertia phase has begun when the shift timer is greater than the predetermined period, when the current gear is not equal to the last current gear, and when the TCM 194 has generated the request for retardation of the spark timing (indicated by the receipt of the STM signal).

At 816, control determines the FF RPM. For example only, control may determine the FF RPM using equation (3), as described above. Control determines the FF torque at 820. For example only, control may determine the FF torque based on the FF RPM and the driver torque request. Control determines the FF APC at 824. For example only, control may determine the FF APC based on the FF torque and the relationship (4), as described above.

Control determines the FF phaser position at 828. Control determines the FF phaser position based on the FF RPM and the FF APC. For example only, control may determine the FF phaser position using a function that relates the FF RPM and the FF APC to the FF phaser position or one or more mappings that relate the FF RPM and the FF APC to the FF phaser position.

Control determines the number of control loops within the inertia phase of the gear shift at 832. For example only, control may determine the number of loops based on the quotient of the inertia phase period over the loop rate of the phaser scheduling module 252. Control may determine the inertia phase period (i.e., the duration of the inertia phase) based on the gear shift. For example, gear shifts between relatively higher gears (e.g., fifth to sixth or vice versa) may have shorter inertia phase periods than gear shifts between relatively lower gears (e.g., first to second or vice versa).

Control applies the second rate limit in adjusting the commanded phaser position toward the FF phaser position at 836. The second rate limit is greater than the first rate limit, which is used for rate limiting changes in adjusting the commanded phaser position toward the target phaser position. Control generates the commanded phaser position at 840 based on the rate limited FF phaser position. Control controls the intake and/or exhaust cam phasers 148 and 150 based on the commanded phaser position. Control may then end. It should be appreciated that the method 800 depicts one control loop and that control may return to 804 instead of ending.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   an inertia phase detection module that determines when an inertia phase of a gear shift is occurring within a transmission;
   a feed-forward (FF) engine speed module that predicts an engine speed for a future time when the inertia phase ends;
   a FF APC module that predicts an air-per-cylinder (APC) for the future time based on the engine speed;
   a FF phaser position module that determines a FF phaser position based on the engine speed and the APC; and
   a phaser control module that controls a camshaft phaser position based on the FF phaser position during the inertia phase of the gear shift.

2. The engine control system of claim 1 further comprising a target phaser position module that determines a target phaser position,
   wherein the phaser control module controls the camshaft phaser position based on the target phaser position before the inertia phase begins and after the inertia phase ends.

3. The engine control system of claim 2 wherein the target phaser position module determines the target phaser position based on a second engine speed measured by an engine speed sensor and a target APC.

4. The engine control system of claim 2 further comprising a rate limit determination module that sets a rate limit based on whether the inertia phase is occurring,
   wherein the phaser control module applies the rate limit in controlling the camshaft phaser position.

5. The engine control system of claim 4 wherein the rate limit determination module sets the rate limit to first rate limit during the inertia phase of the gear shift and that sets the rate limit to a second rate limit before and after the inertia phase, and
   wherein the first rate limit is greater than the second rate limit.

6. The engine control system of claim 2 further comprising a phaser actuator module that controls the camshaft phaser position based on a commanded phaser position,
   wherein the phaser control module ramps the commanded phaser position from the target phaser position to the FF phaser position during the inertia phase of the gear shift.

7. The engine control system of claim 6 wherein the phaser control module determines a number of steps based on a period of the inertia phase of the gear shift, determines a magnitude for each of the steps based on a difference between the target phaser position and the FF phaser position, and ramps the commanded phaser position from the target phaser position to the FF phaser position during the inertia phase using the number of steps of the magnitude.

8. The engine control system of claim 7 wherein the phaser control module determines the magnitude for each of the steps based on a quotient of the difference over the number of steps.

9. The engine control system of claim 1 further comprising a FF torque module that determines a FF torque for the future time based on the engine speed and a driver torque request,
   wherein the FF APC module determines the FF APC based on the FF torque.

10. The engine control system of claim 1 wherein the inertia phase detection module determines that the inertia phase of the gear shift is occurring when a commanded gear from a transmission control module is different than a current gear selected within the transmission, a shift timer is greater than a predetermined period, and the current gear at a current time is different than the current gear at a previous time, and
    wherein the shift timer tracks a period between the current time and when the commanded gear transitioned from being equal to the current gear to being different than the current gear.

11. An engine control method comprising:
    determining when an inertia phase of a gear shift is occurring within a transmission;

predicting an engine speed for a future time when the inertia phase ends;

predicting an air-per-cylinder (APC) for the future time based on the engine speed;

determining a feed-forward (FF) phaser position based on the engine speed and the APC; and controlling a camshaft phaser position based on the FF phaser position during the inertia phase of the gear shift.

12. The engine control method of claim 11 further comprising:

determining a target phaser position; and controlling the camshaft phaser position based on the target phaser position before the inertia phase begins and after the inertia phase ends.

13. The engine control method of claim 12 further comprising determining the target phaser position based on a second engine speed measured by an engine speed sensor and a target APC.

14. The engine control method of claim 12 further comprising:

setting a rate limit based on whether the inertia phase is occurring; and applying the rate limit in controlling the camshaft phaser position.

15. The engine control method of claim 14 further comprising:

setting the rate limit to first rate limit during the inertia phase of the gear shift; and setting the rate limit to a second rate limit before and after the inertia phase, wherein the first rate limit is greater than the second rate limit.

16. The engine control method of claim 12 further comprising:

controlling the camshaft phaser position based on a commanded phaser position; and ramping the commanded phaser position from the target phaser position to the FF phaser position during the inertia phase of the gear shift.

17. The engine control method of claim 16 further comprising:

determining a number of steps based on a period of the inertia phase of the gear shift;

determining a magnitude for each of the steps based on a difference between the target phaser position and the FF phaser position; and ramping the commanded phaser position from the target phaser position to the FF phaser position during the inertia phase using the number of steps of the magnitude.

18. The engine control method of claim 17 further comprising determining the magnitude for each of the steps based on a quotient of the difference over the number of steps.

19. The engine control method of claim 11 further comprising:

determining a FF torque for the future time based on the engine speed and a driver torque request; and determining the FF APC based on the FF torque.

20. The engine control method of claim 11 further comprising:

determining that the inertia phase of the gear shift is occurring when a commanded gear from a transmission control module is different than a current gear selected within the transmission, a shift timer is greater than a predetermined period, and the current gear at a current time is different than the current gear at a previous time; and tracking a period between the current time and when the commanded gear transitioned from being equal to the current gear to being different than the current gear using the shift timer.

* * * * *